United States Patent [19]

Dalgleish

[11] Patent Number: 4,717,016
[45] Date of Patent: Jan. 5, 1988

[54] PACKAGE FOR INGREDIENTS

[76] Inventor: James M. Dalgleish, 124 Myton Rd., Warwick, CV34 6PR, United Kingdom

[21] Appl. No.: 868,008

[22] Filed: May 29, 1986

[51] Int. Cl.⁴ .................. A47J 31/18; B65B 29/04
[52] U.S. Cl. ..................... 206/0.5; 206/219; 99/279; 99/323; 426/77
[58] Field of Search ............ 99/279, 323; 206/219, 206/220, 221, 222, 345, 346, 338, 343, 0.5; 426/77, 85, 134, 132, 111, 112, 115

[56] References Cited

U.S. PATENT DOCUMENTS

| | | | |
|---|---|---|---|
| 1,367,568 | 2/1921 | Smith | 99/323 |
| 1,885,076 | 10/1932 | Bustamante | 206/0.5 |
| 2,867,536 | 1/1959 | Mead et al. | 426/85 |
| 3,102,465 | 9/1963 | Montesano | 206/0.5 |
| 3,615,595 | 10/1971 | Guttag | 426/85 |
| 3,824,322 | 7/1974 | Florella | 426/134 |
| 3,946,652 | 3/1976 | Gorin | 99/323 |
| 4,091,632 | 5/1978 | Marchewka et al. | 426/85 X |
| 4,211,156 | 7/1980 | Zimmermann | 99/323 X |
| 4,387,809 | 6/1983 | Botzler | 206/219 X |
| 4,410,550 | 10/1983 | Gaskill | 206/0.5 X |

FOREIGN PATENT DOCUMENTS

| | | | |
|---|---|---|---|
| 217467 | 5/1958 | Australia | 426/85 |
| 893968 | 11/1982 | Belgium . | |
| 0043030 | 1/1982 | European Pat. Off. . | |
| 631005 | 6/1936 | Fed. Rep. of Germany | 99/323 |
| 1795868 | 9/1959 | Fed. Rep. of Germany . | |
| 1806530 | 5/1970 | Fed. Rep. of Germany . | |
| 2456209 | 11/1974 | Fed. Rep. of Germany . | |
| 2635417 | 2/1978 | Fed. Rep. of Germany | 426/85 |
| 8210584 | 8/1982 | Fed. Rep. of Germany . | |
| 15273 | 9/1897 | Switzerland | 206/0.5 |
| 1223326 | 2/1971 | United Kingdom . | |
| 1448077 | 9/1976 | United Kingdom . | |
| 1452459 | 10/1976 | United Kingdom . | |
| 1483503 | 8/1977 | United Kingdom . | |
| 2057902 | 4/1981 | United Kingdom | 99/323 |

Primary Examiner—George E. Lowrance
Assistant Examiner—T. Graveline
Attorney, Agent, or Firm—Fleit, Jacobson, Cohn & Price

[57] ABSTRACT

A package for ingredients comprises a resilient tube which has apertures provided therein. The apertures are held closed by the resilience of the material of the tube and are opened by application of stress in the longitudinal direction of the tube. Aspects of the invention include mounting of the package in a disposable cup for use in the catering industry or supplying a number of such packages each including ingredients for an instant drink for domestic or catering use. In another aspect the invention discloses use of the package in mixing pigment to a base color paint and use of the package in a plant watering or hydroponic culture system.

13 Claims, 44 Drawing Figures

PACKAGE FOR INGREDIENTS

BACKGROUND OF THE INVENTION

The present invention relates to a package for ingredients and more particularly but not exclusively to a package for ingredients to be dispensed into a liquid.

It is often desirable for manufactures to package ingredients in premeasured quantities for subsequent use in mixing a liquid by a consumer. Some examples of "convenience" food packaging are well known. For example tea bags are used in domestic situations to provide an individual cup of tea as well as pots of tea. Restaurants and cafes also supply individual cups of tea by immersing a tea bag in a cup of hot water and leaving the bag in place for the consumer to remove.

Once the tea bag is removed the consumer is faced with the problem of disposal, either placing the teabag in the saucer or in an ashtray or other receptacle giving an untidy appearance. Such problems are rarely encountered with other drinks such as coffee where "instant" granules or powder are used. However, unlike coffee, tea contains very few soluble solids. Consequently "instant" tea requires "bulking" with other solids to prevent an excess being mixed in water giving an unacceptable strength.

Instant tea if not so bulked requires accurate dispensing to avoid such difficulties.

Industries other than the food industry face similar problems. For example in the paint industry it is possible to supply a base colour paint, usually white, to which a colouring pigment is added prior to use. For consistency of colour it is usual for such systems to be employed by retailers who use complex pigment dispensing systems to add pigments to the base paint to meet customers requirements.

It is not usually convenient for the ultimate consumer to be supplied with base paint and pigment for self mixing since such a consumer would be unlikely to obtain the required colour consistency.

Other industries which supply the consumer with for example chemicals such as weedkillers, fertilisers and the like also need to provide premeasured quantities of ingredients for subsequent mixing.

It is one object of the present invention to provide a package for ingredients capable of use in supplying premeasured quantities of such ingredients and adapted to facilitate distribution and dispersion of the ingredients.

BRIEF SUMMARY OF THE INVENTION

Accordingly the present invention provides a package comprising a resilient tube one end of which is sealed. The resilient tube includes a number of apertures disposed towards the sealed end and which are held closed by the resilience of the tube material. In one embodiment the apertures comprise slits or weakened sections cut into the tube and adapted on application of pressure causing longitudinal stress in the tube to open to form a whisk member adapted to assist agitation of a liquid into which ingredients contained in the tube are dispensed.

In an alternative embodiment the tube has a corrugated portion in which the apertures are formed by slitting outer edges of the corrugations such that on applying longitudinal tension to the tube opening of the corrugation effects opening of the apertures.

A plurality of tubes in accordance with the invention may be mounted on a strip for insertion in a carton or drum. Alternatively individual tubes may be adhesively attached to a disposable cup.

In one use of the invention gas pressure is used to dispense a colouring pigment into a base colour liquid paint. In an alternative use the tube is adapted for attachment to a domestic drill to facilitate agitation of a liquid.

The invention may also find use in hydroponic culture schemes in which a tube including a series of corrugated portions is provided with apertures which may include fertiliser or other chemicals.

INTRODUCTION OF THE DRAWINGS

Embodiments of packages in accordance with the invention will now be described by way of example only with reference to the accompanying drawings of which:

FIGS. 7A and B show an adaptation of the package of FIG. 1 to facilitate use using (e.g.) a domestic drill;

FIG. 8 shows a further adaptation of the package of FIG. 7 to improve distribution of ingredients;

FIG. 9 shows an alternative adaptation to that of FIG. 8;

FIG. 10 shows the package of FIG. 7 with a device to facilitate storage;

FIG. 11 shows a method of using the packages of FIGS. 7 to 10 with a hand brace;

FIG. 12 shows a method of using the packages of FIGS. 7 to 10 with an electrically powered domestic drill;

FIGS. 13A and B show a package and components adapted for dispensing pigment to an automated painting system such as Black and Decker's "Paintmate" (Trademark) system;

FIGS. 20A and B shows steps in the further preparation of the packages of FIG. 19;

DESCRIPTION OF THE PREFERRED EMBODIMENTS

Figure 1:
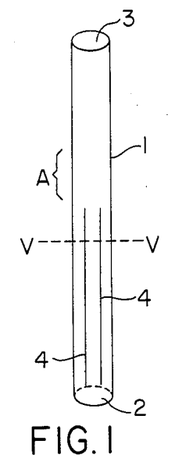
FIG. 1 shows a first package for use in dispensing an ingredient prior to filling with an ingredient.

Referring first to FIG. 1, the package comprises a tube 1 not unlike a common drinking straw, the tube having a diameter of approximately seven millimeters and a length of approximately one hundred millimeters. The lower end 2 of the tube 1 is sealed whilst the upper end 3 remains open to permit insertion of the dried ingredient.

In the present case the invention is considered in relation to tea powder ("instant" tea) and approximately 0.6 grams of the powder is inserted into the tube 1 through the open end 3 which is then sealed. It is here noted however that the package may be used for other dried ingredients such as instant coffee, cocoa, chocolate and the like, whilst the invention may also find use outside the food packaging field for prepacking predetermined quantities of other soluble ingredients such as chemicals for example.

It will also be noted that the package may be used for hot or cold infusion of ingredients.

Towards the lower end of the tube 1 several slits or channels 4 are provided, which, due to the resilience of the tube material remain closed and retain the dried ingredient therein.

Figure 2:
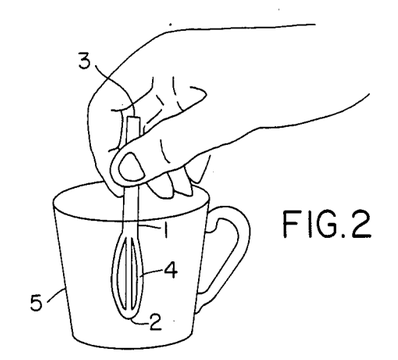
FIG. 2 shows the package of FIG. 1 in use dispensing ingredients of a drink.
Figure 3:
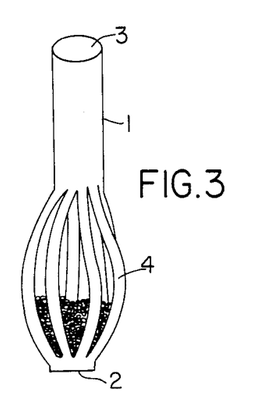
FIG. 3 shows the package of FIG. 1 in an open condition ready to dispense ingredients.
Figure 4A:
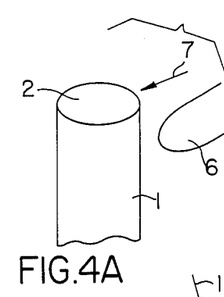
FIGS. 4A to I shows steps which may be used in one method of sealing the package of FIG. 1.
Figure 4B:
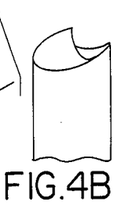
Figure 4C:
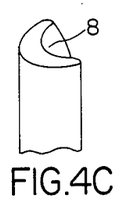
Figure 4D:
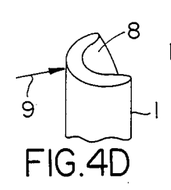
Figure 4E:
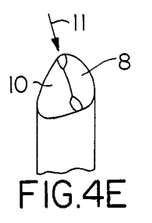
Figure 4F:
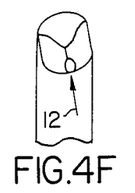
Figure 4G:
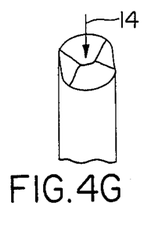
Figure 4H:
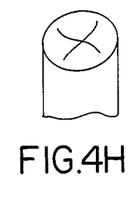
Figure 4I:
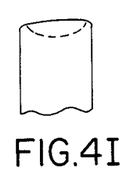

In use, referring also to FIGS. 2 and 3, when pressure is applied to the upper end 3 of the tube 1 when the lower end 2 is prevented from further movement for example by contact with the base of a cup 5, the slits 4 open as the material of the tube 1 deforms. The dried ingredient may now leave the tube 1 through the open slits 4.

At the same time, if the cup 5 contains a liquid such as hot water the liquid enters the tube 1 through the now open slits 4 thereby assisting the dispersion of the ingredient. It will be noted that on the application of pressure to the upper end 3 the tube 1 opens much in the manner of a "chinese lantern" thereby providing a whisk shape which may be used to agitate the liquid in the cup 5.

It will be noted that by selecting a material which softens slightly without melting at normal temperatures for preparation of the solution the deformation of the tube 1 is assisted and will be maintained.

In the present invention a plastics material may be used, the tube 1 being extruded or moulded from polystyrene for example which softens at temperatures of fifty to seventy degrees centigrade but does not melt until a temperature of approximately two hundred and twenty degrees centigrade is reached. Thus at normal temperatures for brewing tea or coffee with water at slightly less than boiling point (100 degrees centigrade) the material softens but does not melt.

A further advantage of the present package over for example a tea bag may now be seen. If a single cup of tea is desired it is possible to place a teabag in a cup, agitate hot water therein with a spoon and then remove the teabag. Having removed the teabag one is faced with the problem of disposal. If in a restaurant it must be left on a saucer with the spoon. An untidy wet teabag presents some problems in such circumstances. However the only residue with the food package herein described is a relatively clean deformed plastics tube. A separate spoon is not needed and only the tube needs to remain for subsequent disposal.

Thus in catering establishments where it is common to provide prepackaged sugar and a tot of milk with a plastic spoon or stirring stick when serving a drink, the requirement for a separate stirring device is also eliminated, leading to further economy by eliminating purchase of stirring sticks or eliminating the washing of spoons.

Turning now to FIG. 4, one method of sealing the ends 2 and 3 of the tube 1 is shown. At step A is shown the tube 1 and a round ended pushing tool 6 which is pressed against the end of the tube 1 in the direction indicated by an arrow 7, progressively in steps B and C to form an indentation 8 which nearly closes the end.

The tool 6 is now pressed in the opposed direction as indicated by an arrow 9 in step D to produce a second indentation 10. Further pressure in the direction indicated by the arrows 11 and 12 in steps E and F using the tool 6 effects almost complete closure of the tube 1. Finally at step G a final push of the tool 6 in the direction of an arrow 14 indents the end to produce a virtually closed end, as shown in diagrams H and I.

Whilst as described four sideways actions are shown it is here noted that the ends 2 and 3 may be closed satisfactorily with three such actions mutually spaced around the circumference of the tube 1.

It will be appreciated that other methods of sealing the tube 1 may be used such as with adhesive, heat sealing, stapling or folding for example. Preferably construction avoids food contaminants.

Figure 6:
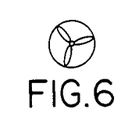
FIG. 6 shows an end of the package of FIG. 1 after sealing using the method of FIG. 4.

One preferred method of sealing is heat sealing in which the plastics material of the tube is crimped under heat which is sufficient to soften the plastics material to an extent at which it adheres itself. Thus, as indicated in FIG. 6, the base of the tube may be sealed along three seams to provide a closure in the form of an equilateral 'Y'.

Such a closure may also be used in the region 'A' of the tube 1 of FIG. 1 rather than sealing the end 3 or in addition thereto. The advantage of an equilateral Y seal in the region 'A' will be seen as maintaining an ingredient in the packet in a preferred area of the tube. It will also be realised that such a seal has less effect on the longitudinal strength of the tube 1 as would occur with a single crimp for example. Thus pressure applied to the end 3 tends to cause the slits or channels 4 to open rather than cause the tube 1 to fold.

Figure 5:
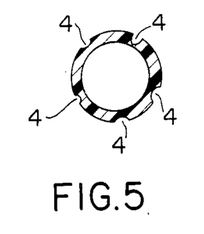
FIG. 5 is a cross sectional view on the line V—V of FIG. 1.

It is also noted that whilst as herein described the tube 1 is provided with the slits 4 which extend from adjacent the end 2 to approximately half-way along the tube 1 other satisfactory ingredient release means may be used. Thus, an an alternative to providing slits 4 cut entirely through the wall of the tube, channels may be provided, the channels being made by a partial depth cut through the wall to leave a thin walled section. Such an arrangement is shown in FIG. 5.

It will be appreciated that the thin-walled sections may be provided during extrusion of the tube, such that when pressure is applied to the "upper" end of the tube, the thin-walled section readily breaks. It will also be realised that one or more perforations may be provided within the thin-walled section to enhance the tendency for the tube 1 to break along the desired line. Such perforations will of course need to be sufficiently small to inhibit premature release of an ingredient contained within the tube.

In an alternative to providing the slits or channels 4 longitudinal of the tube 1, the slits or channels 4 may be arranged spirally along the length of the tube 1.

Figures 7A, 7B, 8, 9, 10, 11, 12:
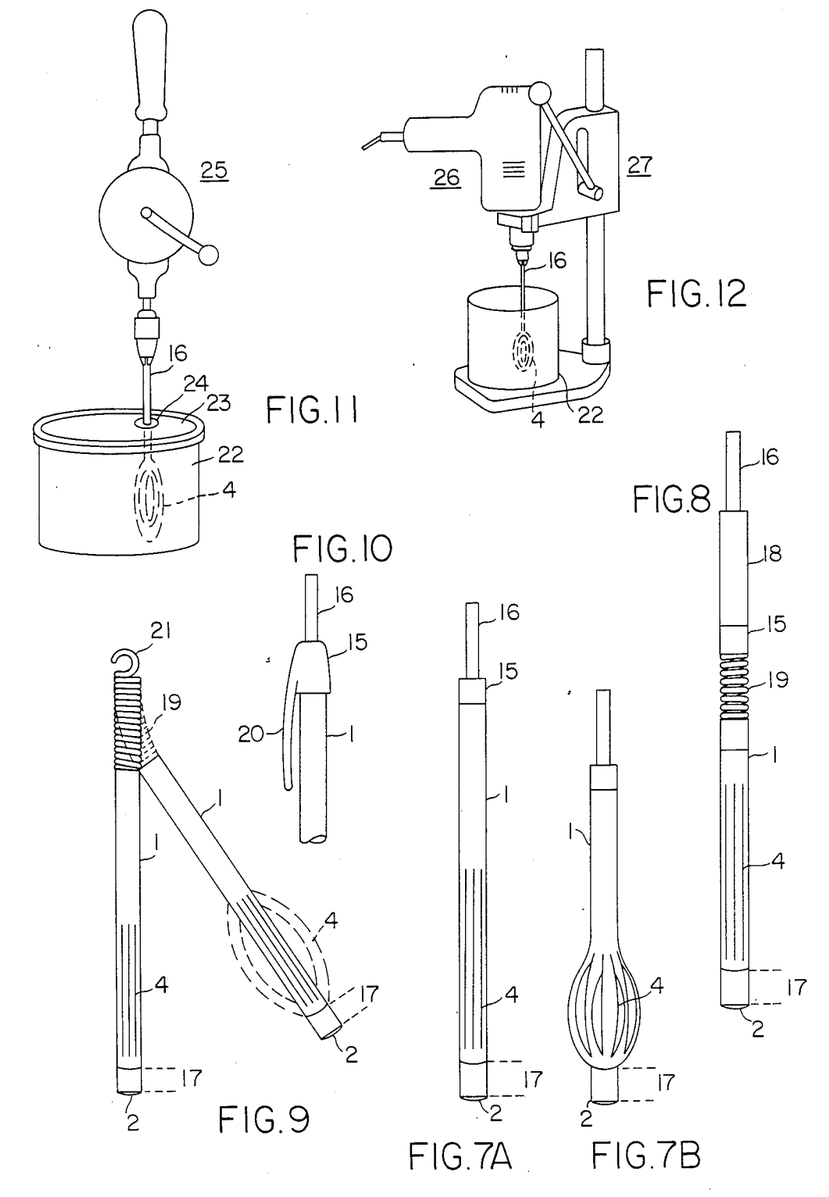

Referring now to FIG. 7, in an adaptation of the package to facilitate mixing of materials such as a pigment into liquid paint or a chemical additive the upper end of the tube 1 is sealed by a member 15 by adhesive or plastics welding for example. The member 15 includes a projecting stub 16 adapted for fitting to a chuck of a rotating machine.

The lower end of the tube 1 in the area 17 may include a solid sealing member fitted inside and plastics welded or held in place by adhesive to provide a portion not adversely affected by rotation against the base of a mixing vessel.

A further adaptation is shown in FIG. 8 in which a spring member 19 is interposed between the sealing member 15 and the stub 16 which, on rotation, will allow the tube 1 to move angularly with respect to a chuck thereby enhancing the agitation of liquid in the mixing vessel.

In the embodiment shown in FIG. 8 the stub 16 includes a removable spacer member 18 which allows an elongated stub to be used to permit deeper penetrations of the tube 1 into a mixing vessel while preventing the insertion of an excess length of stub into a chuck member. The spacer member 18 also serves to strengthen the stub 16 against stress fracture or bending.

Turning now to FIG. 9 an alternative spring adaptation includes a hook member 21 whereby a rotating device with an eye (not shown) may be used. Having hooked the hook member 21 to the eye, on rotation the spring member 19 will allow the tube to be displaced as indicated to facilitate agitation of a liquid (such as paint) in a mixing vessel and assist dispersion of the ingredients (such as pigment) through the slots 4 of the tube 1. The hook member 21 also facilitates storage of tubes 1 on (e.g.) a rack.

An alternative storage mechanism is shown in FIG. 10 to which reference is now made in which a clip 20 is integrally formed with the sealing member 15. With this adaptation a number of tubes 1 may be safely carried in a pocket since, until activation, the contents are securely sealed in the tube 1.

Two possible methods of use of the tubes of FIGS. 7 to 10 are shown in FIGS. 11 and 12. In FIG. 11 it may be seen that the stub 16 of a tube has been inserted in the chuck of a hand brace 25. A sealed container 22 of, say, a base colour paint such as is provided in the Black and Decker "Paintmate" (trademark) system has the seal (not shown) removed from a smaller aperture 24 in the lid 23. The aperture 24 is usually used for connection to a device allowing gas pressure to be used to force paint from within the container through a tube to (e.g.) a paint roller.

As, in the sealed state, the tube 1 has a small diameter it is readily passed through the aperture 24 until the strengthened portion 17 reaches the base of the container 22. Further downward pressure on the tube 1 now causes the slots 4 to open to permit dispersion of pigment held in the tube 1 and, as with the embodiment of FIGS. 1 to 6 to form a whisk facilitating mixing. Rotation of the handle of the brace now assists dispersion of the pigment in the base material.

Alternatively an electrically powered domestic drill 26 such as shown in FIG. 12 may be used. In use the drill 26 is preferably but not essentially mounted in a stand 27. Although it is suggested that the package of FIGS. 7 to 10 is used with a rotating machine for mixing purposes it will be appreciated that the stub 16 may be in the form of a handle to enable a manual whisking action to be used.

Figures 13A, 13B:
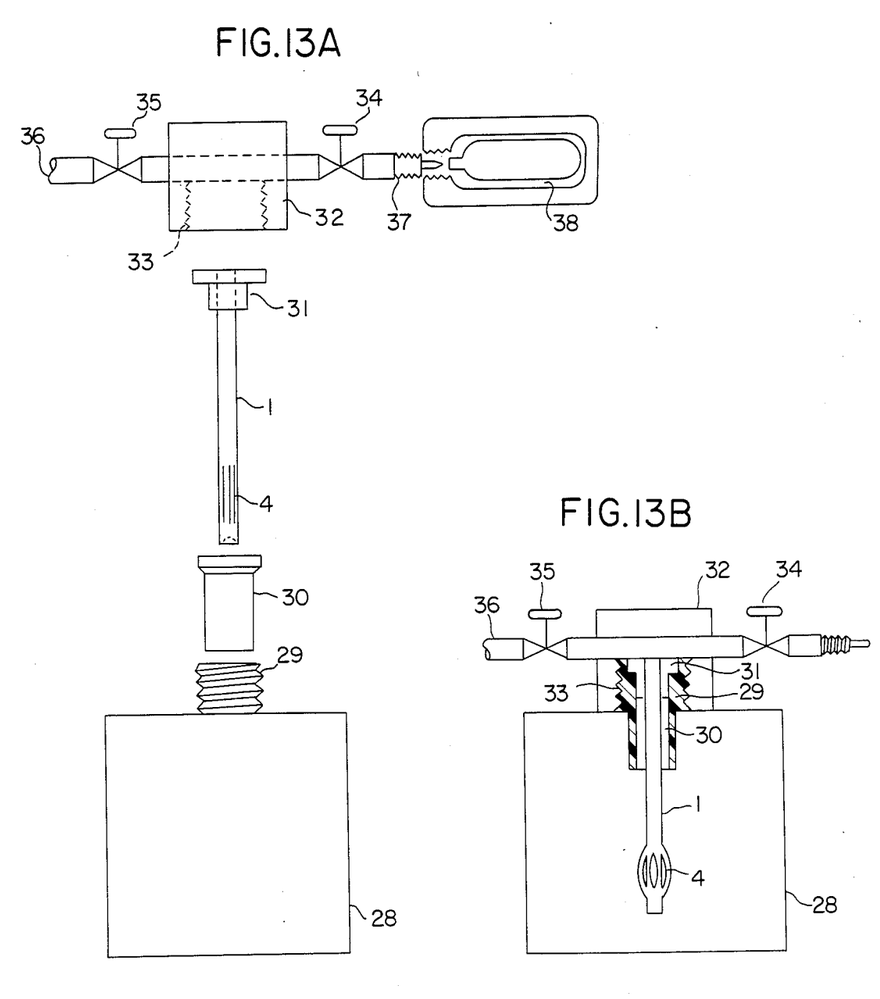

As has been stated with regard to FIG. 11 the cartridge pigment mixing arrangement is particularly suited for use with automatic paint dispensing systems. An adaptation for use with the aforementioned Black and Decker Paintmate (trademark) system is shown in FIG. 13 to which reference is now made.

As has been stated in the Paintmate system a tube connected to a paint roller or other paint application means (not shown) passes through a sealing means into a container of liquid paint. The container is then slightly pressurised to cause paint to pass through the tube to the application means allowing continuous painting without reloading by dipping in the container or using a paint tray.

In the present arrangement the container 28 contains a base paint to which pigment contained in the tube 1 is to be mixed. The tube 1 readily passes through a seal 29 and an adaptor 30 into the container 28 and acts firstly as a pigment dispenser and latterly as a feed pipe.

The upper end of the tube 1 carries a connector member 31 fitted thereto by adhesive or plastics welding for example, the connector member 31 being adapted for sealing to a T connector 32. The T connector 32 includes a sealing member 33 which is adapted to cooperate with the container seal 29 to hold the tube 1 in place and seal the system.

Two taps 34, 35 are provided one on either side of the tube of the T connector to control application of gas pressure to the container 28 and permit paint egress to an outlet tube 36 respectively. The tap 34 is in a line from an adaptor 37 which is arranged for connection to a gas bulb 38 of the kind often used to charge soda drinks dispensers.

In use the tube 1 is fitted to the container 28 using the connector 32. The tube from the paint applicator is fitted to the outlet 36 and the tap 35 closed. The gas charging bulb 38 is fitted to the adaptor 37 and the tap 34 is opened. Gas pressure from the bulb 37 now causes the slots 4 to open and forces the pigment from the tube 1 into the surrounding liquid paint effecting distribution and mixing thereof. The gas also serves to pressure charge the container 28. The tap 34 may now be closed and the tap 35 opened to enable painting to be commenced. It will be realised that the tube 1 now acts as a feeder tube with liquid paint leaving the container by way of the slots 4.

Although the foregoing description relating to FIG. 13 is based upon the package of FIG. 1, the package of FIG. 15 described hereinafter is equally or better suited to operation in the manner detailed above since gas pressure will perform an acceptable activiation of that package.

It will be apparent that, since the tube 1 is disposable there is no requirement for cleaning the feeder tube after use as would occur with a reuseable feeder tube system.

Having considered a package of a first kind I now propose a preferred package for use particularly for drinks dispensing.

Figure 15:
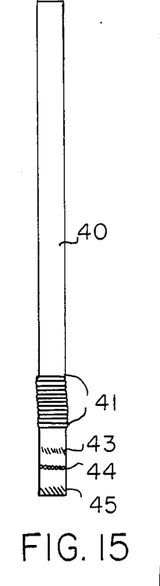
FIG. 15 shows the second package in accordance with the invention.

Accordingly with reference to FIG. 15 the invention uses a tube 40 having corrugations 41 formed therein by use of a die during manufacture. The manufacture of drinking straws including such corrugations is well known for straws of the kind which may be bent in use to improve the drinking angle.

In accordance with the invention the outer edge of the corrugations 41 is slit. Thus referring also to FIG. 14 in FIG. 14A an enlarged cross sectional view of normal corrugations in a tube wall in the unstretched position is shown. When a straw is bent or stretched the corrugations adopt the arrangement shown in FIG. 14B.

Figure 14A:
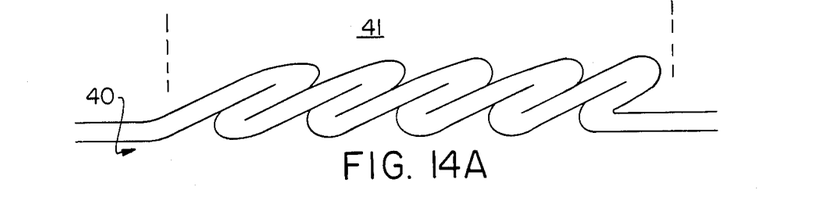
FIGS. 14A to D are cross sectional views of an end of a second package in accordance with the invention.
Figure 14B:
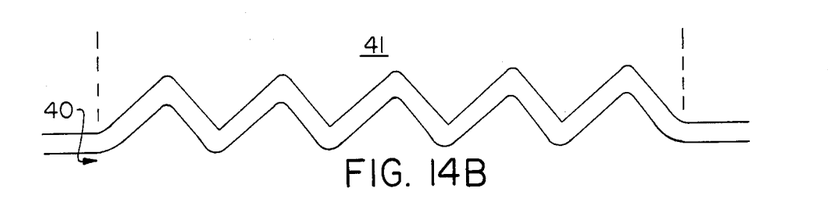
Figure 14C:
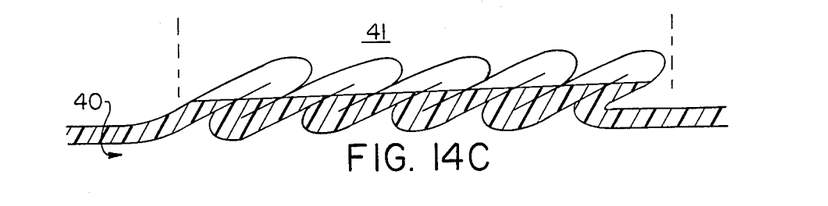
Figure 14D:
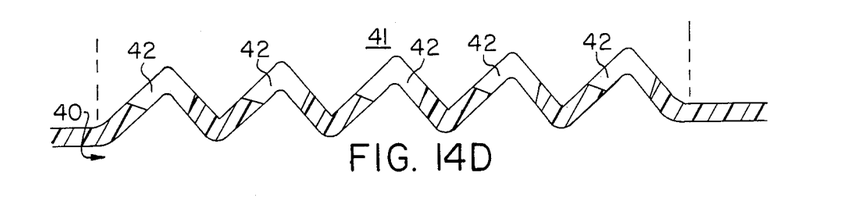

Now by providing a slit down the outside of a corrugation a cross sectional view of one wall of the tube 40 on the slit shows that with the corrugations unstretched the interior of the tube 40 is still sealed from the outside world preventing ingress of contaminants and egress of ingredients held in the tube. This situation is shown in FIG. 14C. However, when the tube 40 is activated by stretching as shown in FIG. 14D a series of apertures 42 open to permit ingredients to leave the tube. The tube 40 may now be used to agitate hot water or milk for example thereby distributing the ingredients through the surrounding liquid.

Referring again to FIG. 15 the lower end of the tube 40 is sealed, by heat crimping for example providing a seal 43. Below the seal 43 perforations 44 are provided the reason for which will become apparent from the description hereinafter. Finally the base of the tube 40 may be attached to a surface by adhesive or other means as indicated in the area 45.

Figure 16:
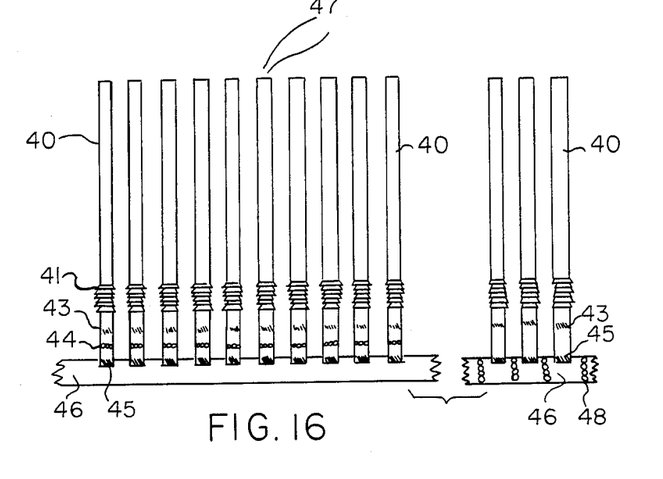
FIG. 16 shows a plurality of packages of the kind shown in FIG. 15 prepared for insertion in a container.
Figure 17A:
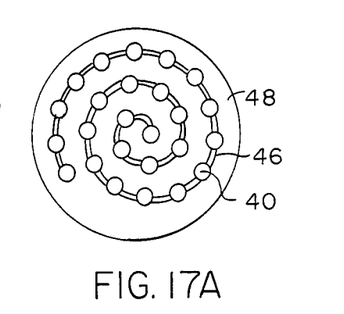
FIGS. 17A and B are plan and perspective views of a first container including packages prepared as shown in FIG. 16.
Figure 17B:
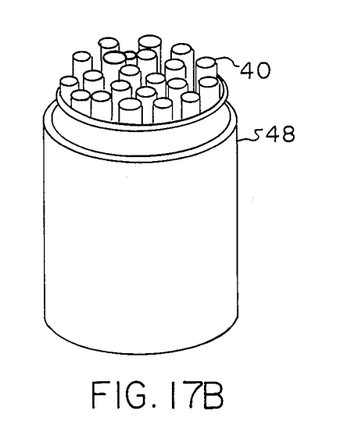
Figure 18A:
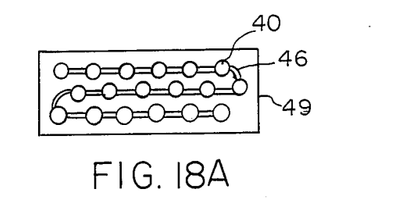
FIGS 18A and B are plan and perspective views of a second container including packages prepared as shown in FIG. 16.
Figure 18B:
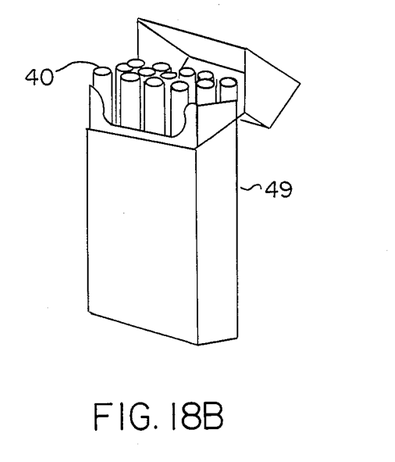

Having considered the basic package consideration is now given to packaging and filling the tubes 40 for distribution. Thus with reference to FIG. 16, the tubes 40 are adhered to a strip 46 in a single row. Using a funnel arrangement 47 on a filling machine ingredients enter the tubes 40 from the top which may be sealed subsequent to the filling operation. The strip 46 and tubes 40 may now be either coiled for fitting in a drum 48 (as shown in FIGS. 17A and B) or folded for insertion in a rectangular package 49 similar to a cigarette pack.

To use one of the tubes 40 on the strip 46 it is first pulled upwards opening the corrugations 41 to "activate" the tube. Further pulling or turning of the tube 40 causes the perforations 44 in the flattened lower end to break off giving a single tube ready for use. Alternatively, the tube 40 may be twisted to break the perforations 44 and then activated by subsequently stretching the tube 40. The latter method of operation may be preferred if the tube content is powder or liquid rather than of granular form.

As an alternative to perforating the tubes, the strip 46 may be perforated as shown at 48. In this case the tubes may be individually separated from the strip 46 and used including the torn off strip portion. It will be appreciated that the seal 43 may be omitted, the tubes 40 being sealed and adhered to the strip 46 in one operation.

Figure 19:
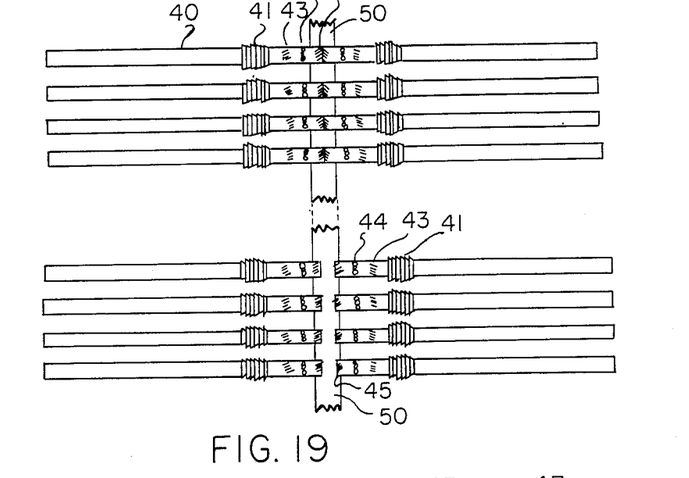
FIG. 19 shows a plurality of packages mounted in an alternative manner to that shown in FIG. 16.
Figures 20A, 20B:
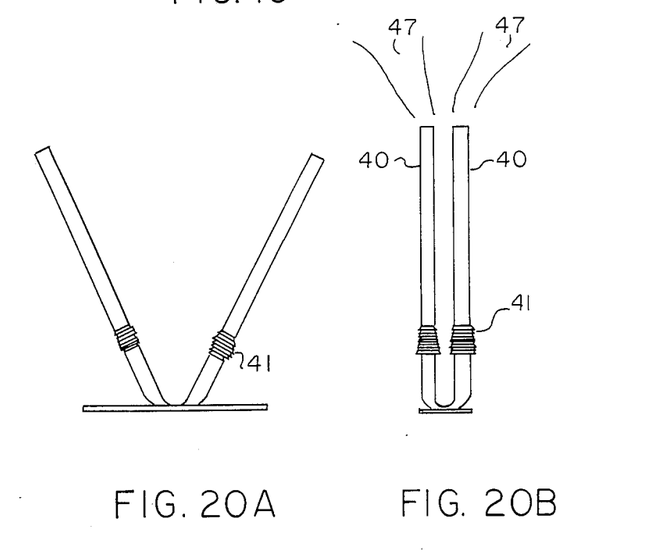

In this form, shown to the right of FIG. 16 the tubes may be supplied in a form similar to a strip of matches. An alternative form for supplying the tubes in strips is shown in FIGS. 19 and 20. In the form shown at the bottom of FIG. 19 individual tubes as previously described are adhered on either side of a strip 50. However, in a preferred manufacturing process the tubes 40 are constructed in pairs as shown in the top of FIG. 19, the pairs being centrally bonded to the strip. Subsequently, as shown in FIGS. 20A and B the pairs are bent upwards for filling from the top of the tubes 40 as previously described.

Figure 21:
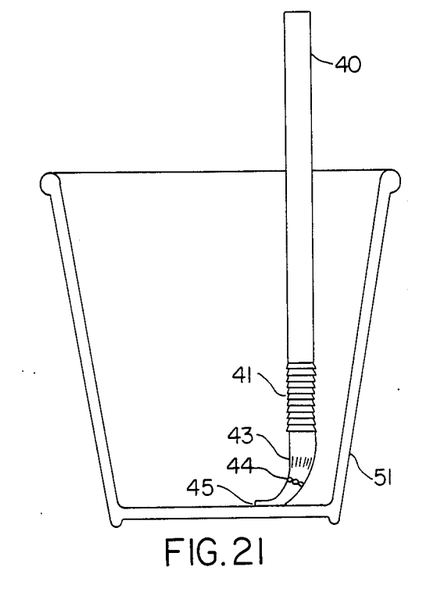
FIG. 21 is a cross sectional view of a container including a package in accordance with the invention.

Referring now to FIG. 21, in an adaptation suited to use particularly in the catering industry the tube 40 may conveniently be adhered to the base of a disposable cup 51 for example. Thus individual tubes may be filled and then sealed to the cup 51 base. Activation is in the same manner as described for the packaged version that is an upward pull to release the ingredients and a twist to break the perforations 44. The tube 40, once detached may be used for stirring. Several tubes may be incorporated in the cup individually including for example coffee, a sweetening agent and a whitener, the user activating only those tubes required for his or her own preference. Unactivated tubes may be either twisted to break the perforation 44 without stretching to activate or left in place.

Figure 22:
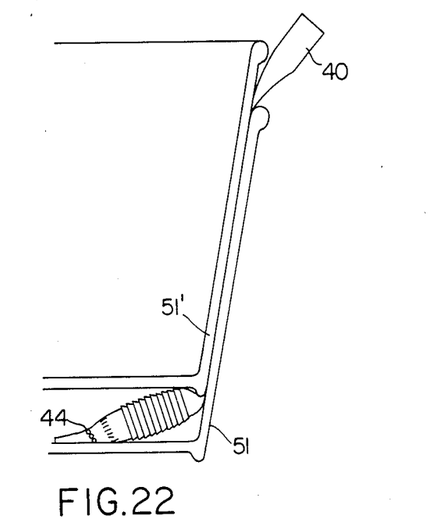
FIG. 22 is a part cross sectional view of a plurality of containers of the kind shown in FIG. 21 placed in a stack.

Flattening the tube 40 above the corrugations 41 allows stacking of the cups 51 as shown in FIG. 22 and if a heat sealing operation is used on the upper portion of the tube 40 provides a flat stirring object.

Figure 23:
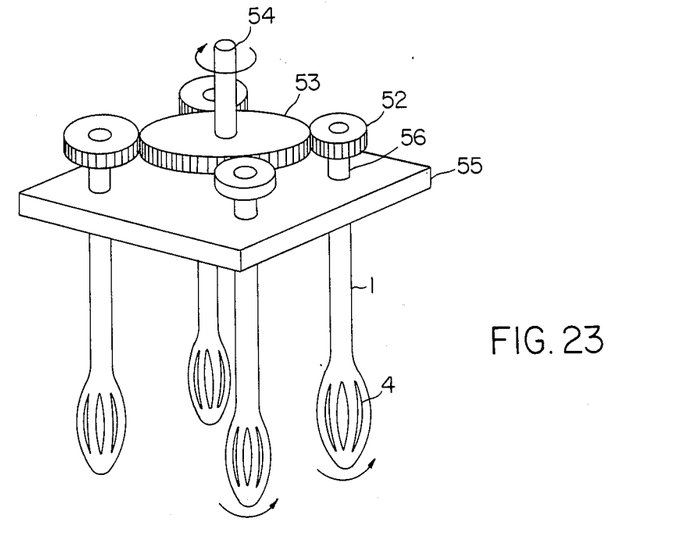
FIG. 23 is a perspective view of apparatus for using a plurality of packages in accordance with the invention in a single mixing operation.

Further consideration is now given to industrial applications of the invention such as in chemical, paint and agricultural industries. One adaptation of the rotating machinery for batch manufacturing is shown in FIG. 23 to which reference is now made. In the adaptor shown four rotating cogs 52 are provided driven from a main cog 53 having a shaft 54 for connection to a chuck.

The cogs 52 each have a shaft 56 protruding through a platform 55. In use one tube 1 is attached to each shaft 56 (for example by push fitting) and then activated. All of the tubes then act to mix and dispense their contents in a surrounding liquid. In this manner multipart chemical mixes for example may be individually packaged for transport between for example a chemical plant and the end user where fresh batches of complete mixes are required. Thus safe transport of two or more part mixtures can be made.

Similarly in retailing paints for example where a base paint is to be mixed with a predetermined selection of pigments to meet an individual customers colour specification, all of the pigments may be mixed to the base paint in one operation.

The invention may also be used in agriculture in both hydroponic culture and "drip" watering systems. This use will now be discussed with reference to FIG. 24 in which a tube dispenser of the kind discussed with reference to FIG. 15 may be used.

Figure 24:
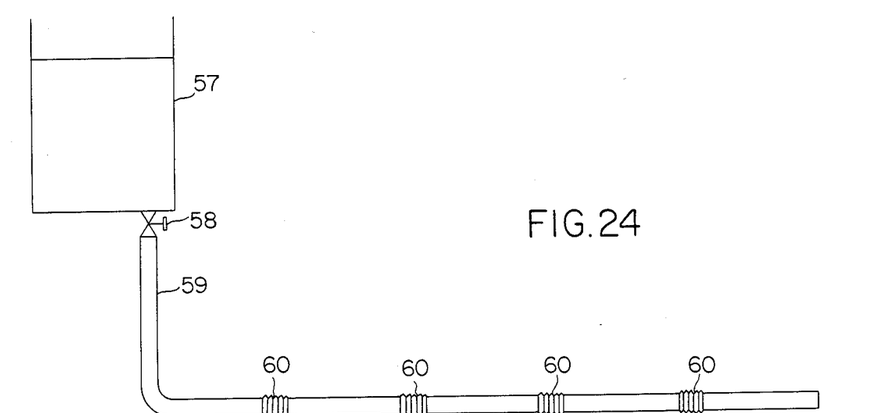
FIGS. 24 and 24A show an adaptation of the invention for use in automatic watering systems or hydroponic culture.

In hyroponic culture plant root systems collect nutrients from a liquid medium to which the nutrients have been added. The liquid medium may be held in a header tank 57 with flow controlled by a valve 58. The invention provides two alternative liquid transmission systems. In the first a continuous length of tubing includes corrugations 60 having one or more slits in the outer edge as previously discussed with reference to FIG. 14. Once the tubing has been laid out on a preferred route, the tubing 59 may be gripped either side of a set of corrugations 60 to activate only those sections required. Thus some corrugations 60 may be opened to permit liquid to pass and others left closed for subsequent use. It will be realised that the corrugations 60 may be reclosed by application of pressure from either side. However with a drinking straw kind of construction of the tubing 59 the actions of opening and closing individual corrugation sets may only be performed a limited number of times.

Figure 24A:
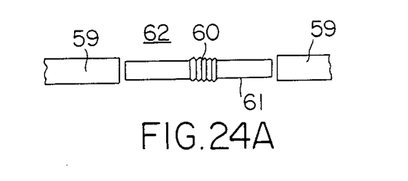

As an alternative the tube 59 may be adapted to fit over disposable tubes including the corrugated section 60 by providing connection portions 61 as shown in FIG. 24A. The tubes shown in FIG. 24A may include a granular fertilizer for example such that slow release of the fertilizer is achieved on passage of water from the header tank 57 or from a main water supply. The ends of the tubes 62 may be capped or sealed for transit.

Figure 25A:
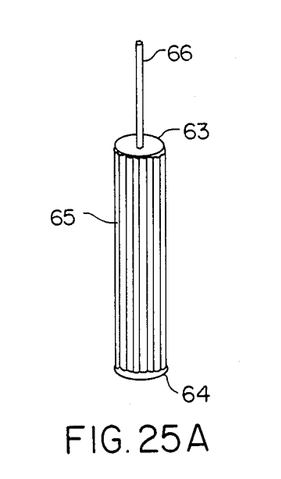
FIGS. 25A, B and C show an adaptation of the package for industrial use.
Figure 25B:
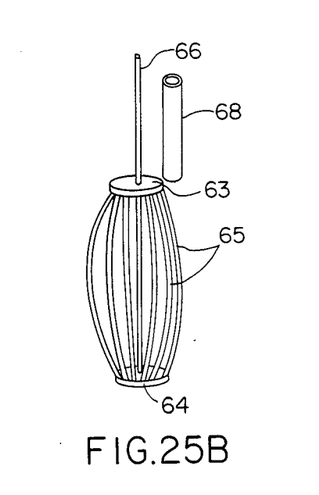
Figure 25C:
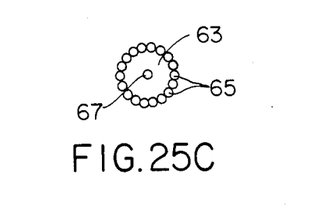

Finally, with reference to FIG. 25 a heavy duty package suited to industrial use may be provided. In this embodiment of a package according to the invention top and botton disc members 63, 64 are provided with strands 65 (of wire for example) attached therebetween. The strands 65 are lightly soldered or glued together to provide a sealed package enclosing ingredients for subsequent release. A rod 66 passes through an aperture 67 in the upper disc 63, the rod 66 being firmly attached to the lower disc 64. To activate the package the rod 66 is pulled through the disc 63 (or the disc 63 is pushed down with with respect to the rod 66 thereby causing the release of the adhesion between the strands 65 which form a whisk and release the contents.

To facilitate use when the rod 66 is to be attached to a chuck of a rotating machine a spacer member 68 may be provided. The spacer 68 may have a screw threaded interior, the rod 66 carrying a corresponding external screw thread whereby the package is activated by rotation of the spacer member.

I claim:

1. A package comprising a tube of resilient material, the tube having at least one sealed end and including a corrugated portion along at least a part of its length, outer edges of said corrugated portion including a plurality of apertures, the apertures being adapted to be held in a closed position by the resilience of the material and to move from said closed position to an open position upon application of longitudinal stressing force to the tube which tends to effect straightening of the corrugations, the internal faces of the corrugations sealing said plurality of apertures in said closed position.

2. A package according to claim 1 in which said tube includes a mounting portion extending beyond said sealed end, said mounting portion being attached inside a container.

3. A package according to claim 1 in which an end of said tube opposed said at least one sealed end includes sealing means, said sealing means further comprising a clip member.

4. A package according to claim 1 in which an end of said tube opposed to said at least one sealed end includes sealing means, said sealing means linking to connector means adapted for connecting said tube to a rotating device.

5. A package according to claim 4 in which spring means is interposed between said sealing means and said connector means.

6. A package according to claim 1 further including liquid supply means connected to said tube to form a watering system.

7. A package according to claim 6 wherein said tube comprises a plurality of said corrugated sections spaced apart along its length.

8. A package according to claim 1 further comprising adaptor means arranged for connection to a source of pressurizing material, application of pressure from said source causing said corrugated portion to straighten to cause opening of said apertures and dispersal of contents of said tube.

9. A package according to claim 8 further including a T connector arranged to seal said adaptor means to a liquid container, said T connector including a first connector for connection to said source of pressurising material and a second connector for connection to an outlet said aperture being further arranged to allow egress of liquid from said container to said outlet after said application of pressure.

10. A package according to claim 1 in which said tube includes a mounting portion extending beyond said sealed end, said mounting portion being attached to a strip member carrying a plurality of such packages.

11. A package according to claim 10 in which said mounting portion includes a weakened section intermediate said strip member and said sealed end.

12. A package according to claim 10 in which said mouting portion includes a plurality of perforations intermediate said strip member and said sealed end.

13. A package according to claim 10 in which said strip member includes a plurality of perforations adjacent to attachment of said mounting portion.

* * * * *